United States Patent [19]

Sederquist

[11] Patent Number: 4,530,886
[45] Date of Patent: Jul. 23, 1985

[54] PROCESS FOR HUMIDIFYING A GASEOUS FUEL STREAM

[75] Inventor: Richard A. Sederquist, Newington, Conn.

[73] Assignee: United Technologies Corporation, Hartford, Conn.

[21] Appl. No.: 678,612

[22] Filed: Dec. 6, 1984

[51] Int. Cl.³ .............................................. H01M 8/04
[52] U.S. Cl. ........................................ 429/13; 429/16; 429/26
[58] Field of Search ................ 429/17, 19, 20, 13, 429/16, 26

[56] References Cited

U.S. PATENT DOCUMENTS

| | | | |
|---|---|---|---|
| 3,677,823 | 7/1972 | Trocciola | 429/17 |
| 3,973,993 | 8/1976 | Bloomfield et al. | 429/17 |
| 3,976,507 | 8/1976 | Bloomfield | 429/17 |
| 4,001,041 | 1/1977 | Menard | 429/19 |
| 4,004,947 | 1/1977 | Bloomfield | 429/17 |
| 4,037,024 | 7/1977 | Landau | 429/17 |
| 4,072,625 | 2/1978 | Pinto | 48/196 A |
| 4,333,992 | 6/1982 | Healy | 429/26 |
| 4,372,759 | 2/1983 | Sederquist et al. | 429/17 |

*Primary Examiner*—Donald L. Walton
*Attorney, Agent, or Firm*—Stephen E. Revis

[57] ABSTRACT

A fuel gas stream for a fuel cell is humidified by a recirculating hot liquid water stream using the heat of condensation from the humidified stream as the heat to vaporize the liquid water. Humidification is accomplished by directly contacting the liquid water with the dry gas stream in a saturator to evaporate a small portion of the water. The recirculating liquid water is reheated by direct contact with the humidified gas stream in a condenser, wherein water is condensed into the liquid stream. Between the steps of humidifying and condensing water from the gas stream it passes through the fuel cell and additional water, in the form of steam, is added thereto.

5 Claims, 1 Drawing Figure

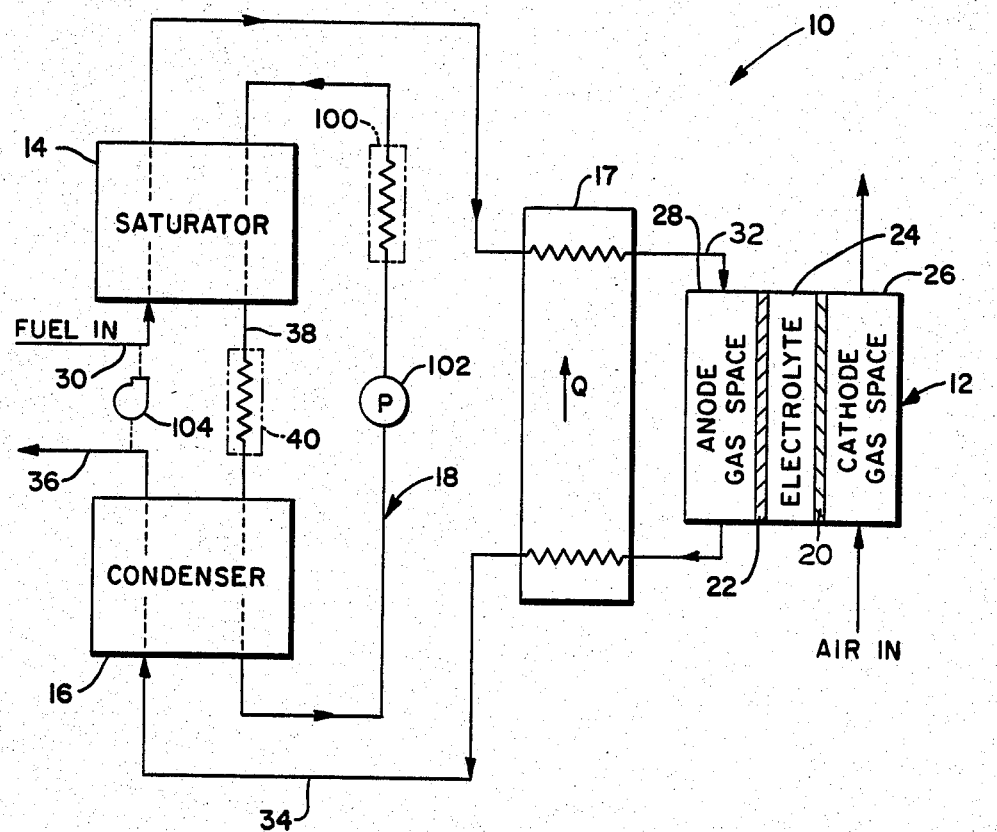

PROCESS FOR HUMIDIFYING A GASEOUS FUEL STREAM

DESCRIPTION

Cross Reference to Related Patent Application

The subject matter of this application is related to the subject matter of commonly owned U.S. Patent Application Ser. No. 678,606 titled "Process For Generating Steam In A Fuel Cell Powerplant" by Richard A. Sederquist, and U.S. Patent Application Ser. No. 678,611 titled "Process For Removing Electrolyte Vapor From Fuel Cell Exhaust Gas" by Richard A. Sederquist, both filed on even day herewith.

TECHNICAL FIELD

This invention relates to fuel cell powerplants and humidifying gas streams therein.

BACKGROUND ART

In fuel cell powerplants requiring steam, such as those incorporating a steam reformer for converting a hydrocarbon fuel to hydrogen, the steam is typically provided by utilizing high grade waste heat, such as heat generated in the fuel cells. Commonly a boiler is used as part of a process to produce the steam. Two patents which describe fuel cell powerplants having integrated steam reforming reactors and boilers for producing the steam for the reactors are commonly owned U.S. Pat. Nos. 4,001,041 and 4,004,947. The heat for creating the steam in the boiler is provided by heated water and steam within a two phase coolant loop which is circulated in indirect heat exchange relation with the boiler and the fuel cell stack.

In U.S. Pat. Nos. 4,072,625 and 4,238,403, 10 to 30% of the steam for a reactor is produced by humidifying the gas stream in a saturator. In the saturator a dry hydrocarbon is passed into direct contact with a circulating stream of liquid water heated by low grade waste heat and picks up the water evaporated therefrom. A boiler provides the balance of the steam for those systems; and the pressure in the steam reform reactor is limited by the pressure at which steam can be raised in the boiler through an indirect heat exchange process.

Commonly owned U.S. Pat. No. 3,677,823 describes a fuel cell powerplant which also includes a boiler to produce at least part of the steam for a steam reforming reactor, the heat for the boiler being provided by the exhaust from the reactor burner. The remainder of the steam is provided by humidifying the fuel in a saturator. In the saturator water and the fuel gas are heated together through a heat exchanger wall.

Commonly owned U.S. Pat. No. 4,333,992 describes a molten carbonate fuel cell powerplant including a steam reformer for producing the hydrogen fuel for the fuel cells. Water for the steam reformer is condensed from the anode exhaust gases of the cell and reduced in pressure by throttling across a valve. The heat from the anode exhaust, prior to the water being condensed therefrom, and the heat of condensation is used to boil the condensed water to produce steam. The steam is raised at a lower pressure than that at which the water is condensed. Both the pressure and temperature in the boiler are lower than the saturation pressure and temperature in the condenser. The steam must then be increased back to system pressure, such as by a series of compressors driven by a motor or a source of waste energy from the powerplant.

Other U.S. Patents describing fuel cells and fuel cell systems which involve reforming hydrocarbon fuels are U.S. Pat. Nos. 3,539,395; 3,453,146; and 3,544,374.

DISCLOSURE OF THE INVENTION

One object of the present invention is a process for producing steam at a high total pressure using low grade heat.

Another object of the present invention is a more efficient process for humidifying a fuel gas stream for use in the fuel cells of a fuel cell powerplant.

According to the present invention a relatively dry gas stream passes through a saturator in direct contact with a warmer, recirculating liquid water stream passing through the saturator, some of the liquid evaporating into the gas stream to humidify the gas stream, the cooled liquid thereafter being reheated by directly contacting such liquid, in a condenser, with the humidified gas stream from the saturator, which gas stream has been further humidified prior to entering the condenser, wherein the heat absorbed by the recirculating water as it passes through the condenser is used to provide the heat of vaporization required to vaporize the liquid in the saturator.

In a preferred emodiment the humidified gas stream leaving the saturator contains the fuel for a stack of fuel cells. This moist fuel is introduced into the fuel cells and reacts electrochemically therein to produce electricity, heat and additional water, which further humidifies the gas stream. This moist, hot exhaust gas stream from the fuel cells passes through the condenser in direct contact with the cooled water from the saturator which water is continuously recirculated between the condenser and saturator. The moist, warm anode exhaust provides sensible heat and heat of condensation to heat the liquid water in the circulating water loop as the streams pass in direct contact with each other in the condenser. The heat of condensation provides the bulk of the heat transferred to the circulating water stream, which heat is used in the saturator to vaporize a portion of the recirculating heated water as it is brought into contact with a relatively dry fuel gas in the saturator, thereby humidifying the fuel gas.

In a system including molten carbonate fuel cells, the gas stream which has been humidified in the saturator as it contacts the hot, circulating water becomes even wetter as it reacts on the anode side of the fuel cells since all the water of the fuel cell reaction is produced on the anode side of the cell. The anode exhaust thus has considerbly more water in it than when it entered the fuel cell; and only a portion of that water needs to be condensed in the condenser by contact with cooler water (from the saturator) in the recirculating water loop. Thus, the temperature at which the water condenses is higher than the temperature at which the water is evaporated in the saturator so that the heat of condensation can readily be used to provide the heat of evaporation without an external heat source or perhaps with only a minimal amount of additional heat from some other source. Thus, because the low grade heat of condensation is used to evaporate the water within the system, virtually all of the heat produced in the fuel cell may be used elsewhere (rather than to raise steam for humidification).

By saturating the fuel gas stream in this manner the total pressure of the gases entering the fuel cells is not limited by the pressure to which steam can be raised in a boiler elsewhere in the system, which has been a draw back of the prior art. Also, the use of very moist (preferably saturated) fuel gas in the anode of a molten carbonate fuel cell can increase the oxygen to carbon ratio within the cells to a point outside the carbon formation region and prevent carbon build up within the cells, which has been a problem with prior art systems.

The foregoing and other objects, features and advantages of the present invention will become more apparent in the light of the following detailed description of preferred embodiments thereof as shown in the accompanying drawings.

BRIEF DESCRIPTION OF THE DRAWING

The sole FIGURE is a schemtic representation of a portion of a molten carbonate fuel cell powerplant which incorporates the features of the present invention.

BEST MODE FOR CARRYING OUT THE INVENTION

Consider, as an exemplary embodiment of the present invention, the portion of a powerplant depicted schematically in the drawing. The powerplant is generally designated by the reference numeral 10 and includes a fuel cell stack generally designated by the reference numeral 12, a contact saturator 14, a contact condenser 16, a regenerative heat exchanger 17, and a closed water loop 18. The stack 12 will generally comprise a plurality of fuel cells connected in series electrically through a load, but is herein depicted as only comprising a single cell for purposes of clarity. As herein shown each cell includes a cathode electrode 20 spaced from an anode electrode 22 and including an electrolyte retaining matrix 24 therebetween. The cell is preferably a high temperature cell which operates at greater than 1000° F. Molten carbonate electrolyte fuel cells typically operate between 1100° and 1300° F. Lower temperature fuel cells, such as phosphoric acid electrolyte fuel cells, could also be used, but the present invention would not provide all of the advantages described herein with respect to high temperature fuel cells. Each cell also includes a cathode gas space 26 on the nonelectrolyte side of the cathode electrode 20 and an anode gas space 28 on the nonelectrolyte side of the anode electorde 22.

In accordance with the teachings of the present invention, the saturator 14 and the condenser 16 both operate by having direct contact between a flowing liquid and a gas to be either humidified (in the saturator) or from which water is to be condensed (in the condenser). The saturator and condenser are filled with a high surface area inert material such as plastic, ceramic, or metallic saddles, rings, or suitable packing material or trays, over and through which the liquid and the gas pass simultaneously in direct contact. Preferably the liquid passes downwardly by gravity while the gases travel countercurrent thereto.

The principal driving force for either humidifying the gas stream in the saturator or condensing water from the gas stream in the condenser is due to the local absolute value difference between the liquid water temperautre and the gas saturation temperature. The rate of the circulating water flow required depends on the amount of water to be transferred between the condenser and the saturator and the desired temperature change which the circulating water will experience in the condenser or saturator. Approximately, a circulation rate of 20 times the evaporation rate (or condensation rate, which is the same as the evaporation rate) is required for approximately a 50° F. liquid water temperature change in either the saturator or condenser. The sensible heat picked up in the condenser or given up in the saturator by the recirculating water stream is essentially equal to the energy requirements of the condenser or the saturator to condense or evaporate the water transferred in the process.

In operation, a fuel gas which may contain hydrogen, carbon oxides, methane, and impurities, and which is relatively dry, is directed into and through the saturator 14 via a conduit 30. To this fuel gas may also be added gas recycled by a blower 104 from the condenser exhaust gas in conduit 36. The addition of this recycle gas increases the molar flow of gas entering the saturator and reduces the required water concentration and saturation temperature of the gas leaving the saturator to achieve a given amount of water transfer in the process. Simultaneously with the gas, liquid water at a temperature below its boiling point, but higher than the required exit gas saturation temperature, passes downward through the saturator 14 in direct contact with the gas. Some of the liquid evaporates within the saturator and the liquid water stream is concurrently reduced in temperature. The gas stream increases in saturation temperature as it continues to pick up evaporated water and approaches, in the limit, a saturation temperature equal to the inlet temperature of the hot water entering the saturator. The size and efficiency of the saturator will determine how close the gas stream will approach this saturation temperature. Preferably, sufficient water is added to the fuel gas in the saturator to increase the oxygen to carbon ratio to above 2.5. This will eliminate carbon formation in any equipment downsteam of the saturator.

After being humidified, the moist gas stream temperature is increased in a regenerative heat exchanger 17, and is then directed into the anode gas spaces 28 via a conduit 32 and electrochemically reacts therein to produce electricity, heat, water, and carbon dioxide. The even wetter gas stream leaves the anode gas space 28, gives up heat in the heat exchanger 17, and is directed into the contact condenser 16 via a conduit 34. It thereupon passes through the high surface area material of the condenser and exits via the conduit 36. The water in the loop 18 leaves the saturator 14 and is directed into the condenser 16 via a conduit 38. Although it has dropped in temperature by passing through the saturator 14, if its temperature is not deemed low enough for efficient heat and mass transfer in the condenser 16, a further temperature reduction may have to be effected, as at 40. Any heat removed at 40 must be replenished, as at 100, and would therefore be interpreted as a loss in efficiency of the process since an external source of heat is being used to help sustain the process. The cooled liquid water then passes through the high surface area material of the condenser 16 in direct contact with the hotter anode exhaust gases passing therethrough. The temperature of the liquid water entering the condenser should be lower than the required exit gas saturation temperature. The saturation temperature approaches, in the limit, the inlet liquid water temperature. The size and efficiency of the condenser would determine how close the gas stream approaches this saturation temperature. With the appropriate fuel gas composition and flow rate, and with a reasonable approach to the limiting saturation temperatures in both the condenser and saturator, the process can be made close to or completely self sustaining requiring neither cooling at 40 nor heating at 100. In other cases the amount of external heat required to help sustain the humidification process can be minimized or substantiallly reduced.

Obviously, if the gas stream entering the condenser contained only the water which was evaporated into it in the saturator, the process would be severely limited, requiring heating at 100 and cooling at 40 to provide the sole driving forces to sustain the process. Fortunately, in molten carbonate fuel cells, (and in other types of cells such as high temperature solid oxide fuel cells) all the water generated by the electrochemical reaction is produced and released at the anode. For each mole of hydrogen electrochemically reacted at the anode one mole of water is produced, thus increasing the water content of the fuel gas stream. Therefore, it can be seen that all the water evaporated in the saturator can be replenished in the condenser. A further advantage of the present invention is that the temperature at which water condenses in the condenser is higher than the temperature at which water is evaporated in the saturator. This means that the heat of condensation absorbed by the water as it passes through the condenser can be used to provide the heat of vaporization in the saturator. The use of the heat of condensation to provide the heat of evaporation allows the use of the heat produced in the fuel cell to be used for purposes other than raising steam for humidification.

The following is an example illustrating the ability of the present process to humidify, without any external heating or cooling, a dry fuel gas stream for use in a molten carbonate fuel cell such that the gas stream oxygen to carbon ratio exceeds 2.5. The saturator and condenser are assumed to be of the counter-flow type. The fuel cell stack, saturator, and condenser are also assumed to operate at 120 psia. At that pressure the boiling point of water is 341° F. In this example the design point for the circulating water loop is a 50° F. drop in temperature in the saturator and a corresponding 50° F. increase in temperature within the condenser. For this example it is assumed the temperature of the liquid water in the recirculating loop is 298° F. at the entrance to the saturator. It drops 50° F. within the saturator and recovers 50° F. in the condenser. The fuel gas entering the saturator is assumed to be a dry shifted coal gas having a molar composition of $0.9H_2 + 0.6CO_2$. Because it is dry its saturation temperature is less than 0° F. To achieve an oxygen to carbon ratio, at the saturator exit, of about 2.6, 1.4 moles of water is transferred to the gas stream in the saturator. This will yield a mole fraction of water of 0.483 in the saturator exit gas. Such a gas will have a partial pressure of water of 57.96 psia and a saturation temperature of 291° F. On a molar basis, assume that the fuel cell stack consumes 0.8 moles of the hydrogen in the fuel gas. This will result in 0.8 moles of water and 0.8 moles of $CO_2$ forming at the anode. The molar composition of the anode exhaust gas will therefore be: $0.1H_2 + 1.4CO_2 + 2.2H_2O$. Its mole fraction of water is thus 0.595, corresponding to a partial pressure of water of 71.4 psia and a saturation temperature of 304° F. In the condenser 1.4 moles of water is transferred from this gas stream into the recirculating water loop. The resulting gas leaving the condenser has a mole composition of: $0.1H_2 + 1.4CO_2 + 0.8H_2O$. Its mole fraction of water is 0.348; its partial pressure of water is 41.7 psia; and its saturation temperature is 270° F. Note that the difference between the fuel gas saturation temperature entering the saturator and the liquid water temperature leaving the saturator is at least 248° F., while there is a 7° F. difference between the saturation temperature of the gas leaving the saturator and the temperature of the water entering the saturator. Correspondingly, the saturation temperature of the gas entering the condenser is about 6° F. higher than the temperature of the liquid water leaving the condenser; and the gas saturation temperature exiting the condenser is 22° F. higher than the water temperature entering the condenser. For this example it is required that the water flow rate within the loop be about 18 times the rate at which water evaporates in the saturator. This number is arrived at by knowing that the water flow rate multiplied by its heat capacity multiplied by its temperature change must equal the weight flow of steam generated multiplied by its heat of vaporization.

Although the invention has been shown and described with respect to a preferred embodiment thereof, it should be understood by those skilled in the art that other various changes and omissions in the form and detail thereof may be made therein without departing from the spirit and the scope of the invention.

I claim:

1. In a process for operating a fuel cell powerplant, the powerplant comprising a fuel cell stack including anode gas compartments and cathode gas compartments, wherein a gas stream comprising a gaseous fuel for the stack requires humidification, the steps of:
   (a) passing the gas stream requiring humidification through a saturator;
   (b) directing the humidified gas stream from the saturator into and through the anode gas compartments of the stack;
   (c) directing at least a portion of the exhaust from the anode gas compartments through a condenser;
   (d) circulating a mass of liquid water, in a loop, alternately through the saturator of step (a) and the condenser of step (c) in direct contact with the gas streams passing therethrough, the liquid water cooling the gas stream within the condenser and causing condensation of a portion of the water vapor therein, which condensate is picked up by the circulating water stream along with sensible heat and the heat of condensation given up by the gas stream in the condenser, wherein as the heated liquid water stream from the condenser passes through the saturator, a portion of the liquid water evaporates into the gas stream within the saturator to provide all the water vapor necessary to humidify the gas stream to the level required, substantially all of the heat of vaporization in the saturator being provided by the heat of condensation transferred from the anode exhaust gas stream to the circulating liquid water stream in the condenser.

2. The process according to claim 1 wherein the gas stream includes carbon and is humidified within the saturator to the extent necessary to increase its oxygen to carbon ratio to 2.5 or greater.

3. The process according to claim 1 wherein the fuel cell stack is operated at a temperature of at least 1000° F.

4. The process according to claim 2 wherein the steps of introducing a gas stream into the saturator comprises introducing into the saturator a mixture of gaseous fuel and a portion of the gas exiting the condenser.

5. The process according to claim 1 wherein the fuel cell stack uses molten carbonate electrolyte and is operated at a temperature of at least 1100° F.

* * * * *